United States Patent
Ito et al.

(10) Patent No.: US 7,668,106 B2
(45) Date of Patent: Feb. 23, 2010

(54) NETWORK MANAGEMENT SYSTEM, AND NETWORK MANAGEMENT METHOD

(75) Inventors: Yuji Ito, Yokohama (JP); Norio Nakamoto, Yokohama (JP); Masataka Mukaihara, Yokohama (JP); Shinichi Kuranari, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 569 days.

(21) Appl. No.: 10/978,815

(22) Filed: Nov. 1, 2004

(65) Prior Publication Data

US 2005/0276232 A1 Dec. 15, 2005

(30) Foreign Application Priority Data

Jun. 10, 2004 (JP) .............................. 2004-173107

(51) Int. Cl.
*G01R 31/08* (2006.01)
(52) U.S. Cl. .................................... 370/241.1; 370/401
(58) Field of Classification Search ........................ None
See application file for complete search history.

(56) References Cited

U.S. PATENT DOCUMENTS

| | | | | |
|---|---|---|---|---|
| 6,765,921 | B1 * | 7/2004 | Stacey et al. ................. | 370/401 |
| 7,069,343 | B2 * | 6/2006 | Goringe et al. ............. | 709/249 |
| 7,299,495 | B2 * | 11/2007 | King et al. ..................... | 726/22 |
| 7,305,492 | B2 * | 12/2007 | Bryers et al. ................. | 709/249 |
| 7,359,328 | B1 * | 4/2008 | Allan ....................... | 370/236.2 |

(Continued)

FOREIGN PATENT DOCUMENTS

| | | |
|---|---|---|
| JP | 9-051347 | 2/1997 |
| JP | 2002-140240 | 5/2002 |
| JP | 2002-252631 | 9/2002 |
| JP | 2002-281084 | 9/2002 |
| JP | 2003-069644 | 3/2003 |
| JP | 2003-169070 | 6/2003 |
| JP | 2003-244144 | 8/2003 |

OTHER PUBLICATIONS

Igor Bryskin, OSPF Based Layer 1 VPN Auto-Discovery, May 13, 2008, IETF, pp. 1-12.*

(Continued)

*Primary Examiner*—Jayanti K Patel
*Assistant Examiner*—Hooman Houshmand
(74) *Attorney, Agent, or Firm*—Katten Muchin Rosenman LLP

(57) ABSTRACT

To collectively manage user networks connected to a virtual private network (VPN) without such time and effort necessary for an operation management server to be ready for an expansion MIB for each of vendors. Provided is a network management system, including: a first edge router, an operation management server and a second edge router which connects to the first edge router, the second edge router being included in the network constituted for each of the user groups, wherein the first edge router includes: collecting unit for collecting management information regarding constituent elements of the network constituted for each of the user groups from the second edge router on the network constituted for each of the user groups, unit for storing the management information in correspondence with the virtual private network for each of the user groups, and unit for returning the management information when receiving, from the operation management server, a request for the management information brought in correspondence with the virtual private network for each of the user groups, and the operation management server includes requesting unit for designating the virtual private network for each of the user groups and requesting the first edge router to return the management information regarding the constituent elements of the network constituted for each user group connected to the virtual private network.

7 Claims, 11 Drawing Sheets

U.S. PATENT DOCUMENTS

| | | | |
|---|---|---|---|
| 2001/0055308 A1* | 12/2001 | Afrakhteh et al. | 370/401 |
| 2003/0035424 A1* | 2/2003 | Abdollahi et al. | 370/392 |
| 2003/0041167 A1* | 2/2003 | French et al. | 709/238 |
| 2003/0046427 A1* | 3/2003 | Goringe et al. | 709/242 |
| 2003/0120502 A1* | 6/2003 | Robb et al. | 705/1 |
| 2006/0233180 A1* | 10/2006 | Serghi et al. | 370/401 |
| 2006/0291450 A1* | 12/2006 | Ramachandran et al. | 370/352 |
| 2007/0076616 A1* | 4/2007 | Ngo et al. | 370/241 |
| 2007/0100981 A1* | 5/2007 | Adamczyk et al. | 709/223 |
| 2007/0104119 A1* | 5/2007 | Sarkar et al. | 370/254 |
| 2007/0140135 A1* | 6/2007 | Sheppard | 370/250 |
| 2007/0217436 A1* | 9/2007 | Markley et al. | 370/401 |
| 2008/0240122 A1* | 10/2008 | Richardson et al. | 370/401 |
| 2008/0285445 A1* | 11/2008 | Riddle et al. | 370/230.1 |

OTHER PUBLICATIONS

Notice of Reason for Rejection dated Apr. 28, 2009, from the corresponding Japanese Application.

* cited by examiner

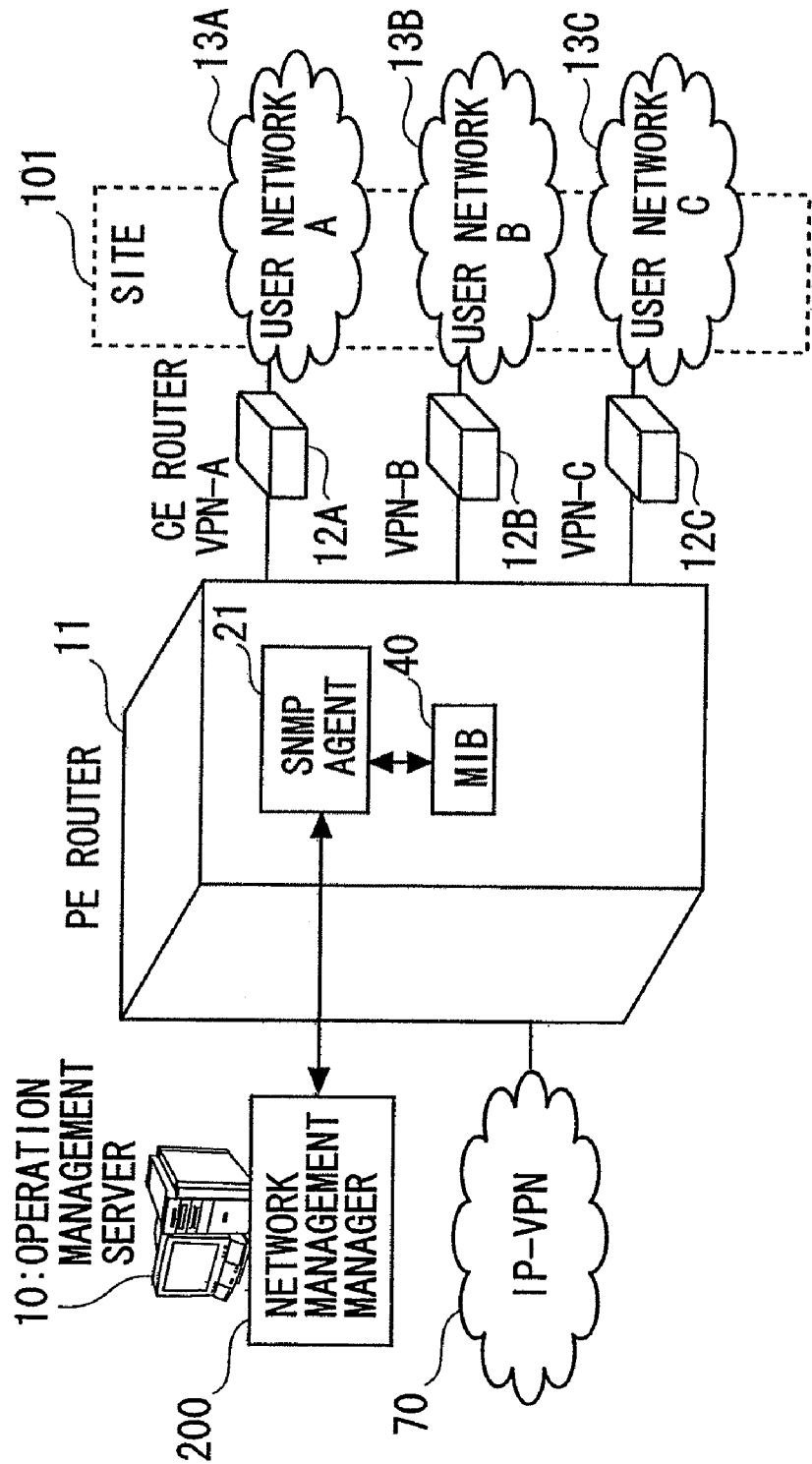

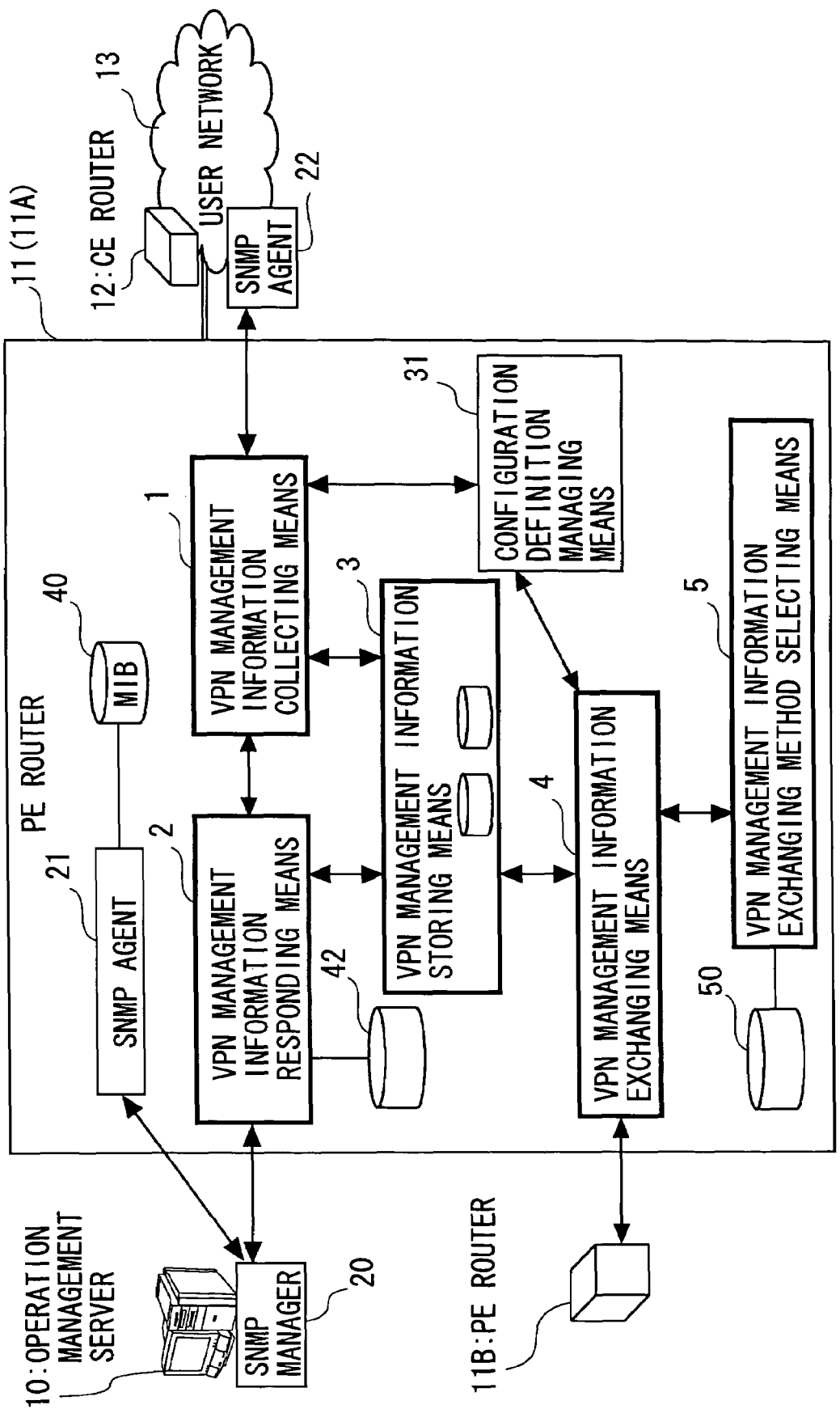

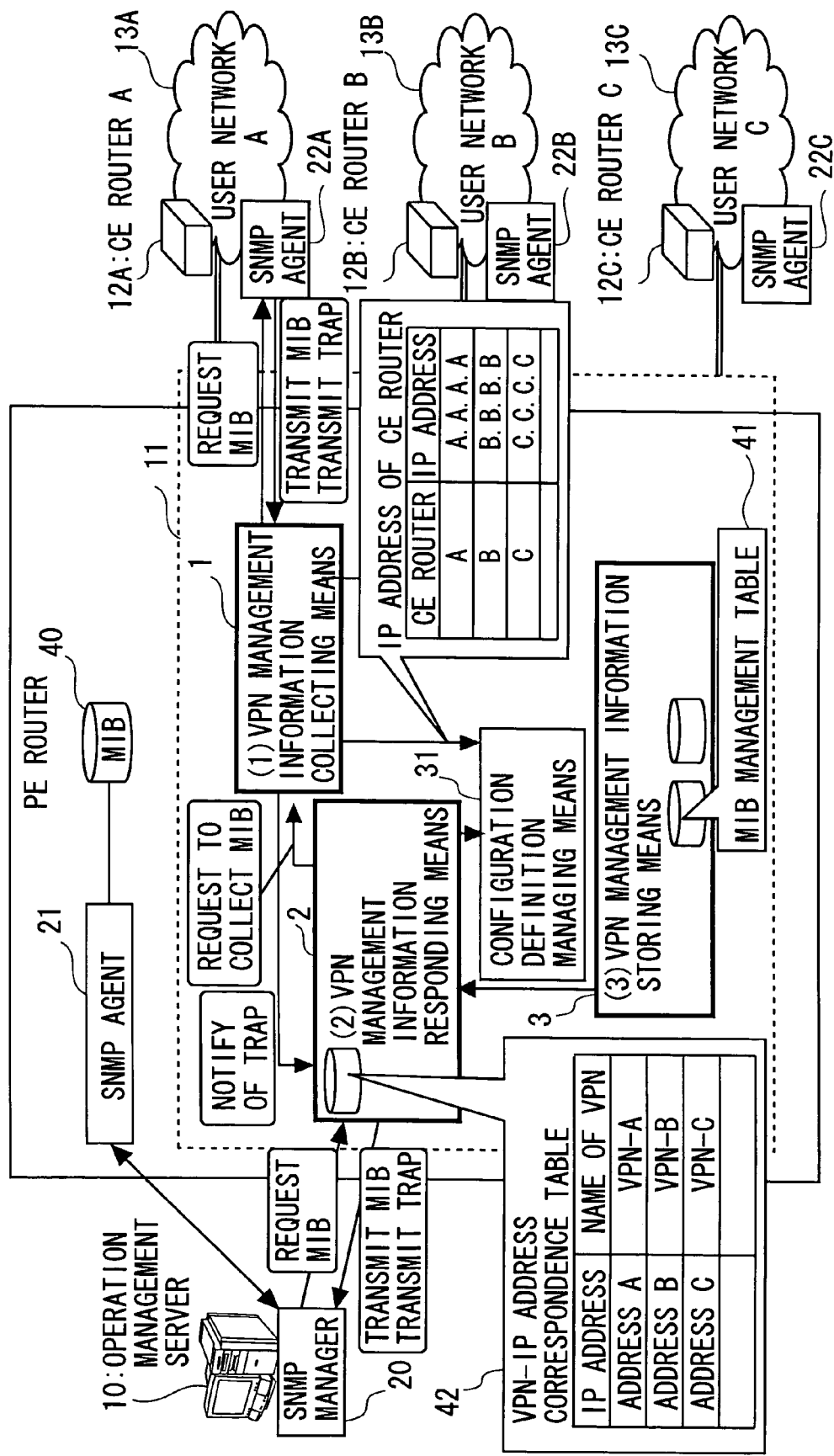

FIG. 4

| NAME OF VPN | NAME OF MIB | MIB VALUE |
|---|---|---|
| VPN-A | interfaces.ifNumber.0 | 2 |
| VPN-A | interfaces.ifTable.ifEntry.ifIndex.1 | 1 |
| VPN-A | interfaces.ifTable.ifEntry.ifIndex.2 | 2 |
| VPN-A | interfaces.ifTable.ifEntry.ifDescr.1 | lo0 |
| VPN-A | interfaces.ifTable.ifEntry.ifDescr.2 | eth0 |
| VPN-A | interfaces.ifTable.ifEntry.ifType.1 | 24 |
| VPN-A | interfaces.ifTable.ifEntry.ifType.2 | 6 |
| VPN-A | ... | ... |
| VPN-B | interfaces.ifNumber.0 | 3 |
| VPN-B | interfaces.ifTable.ifEntry.ifIndex.1 | 1 |
| VPN-B | interfaces.ifTable.ifEntry.ifIndex.2 | 2 |
| VPN-B | ... | ... |

FIG. 7

| NAME OF VPN | SITE | NAME OF MIB | MIB VALUE |
|---|---|---|---|
| VPN-A | SITE 101 | interfaces.ifNumber.0 | 2 |
| VPN-A | SITE 101 | interfaces.ifTable.ifEntry.ifIndex.1 | 1 |
| VPN-A | SITE 101 | interfaces.ifTable.ifEntry.ifIndex.2 | 2 |
| VPN-A | ... | ... | ... |
| VPN-A | SITE 102 | interfaces.ifNumber.0 | 4 |
| VPN-A | SITE 102 | interfaces.ifTable.ifEntry.ifType.1 | 1 |
| VPN-A | SITE 102 | interfaces.ifTable.ifEntry.ifType.2 | 2 |
| VPN-A | ... | ... | ... |
| VPN-B | SITE 101 | interfaces.ifNumber.0 | 3 |
| VPN-B | SITE 101 | interfaces.ifTable.ifEntry.ifIndex.1 | 1 |
| VPN-B | SITE 101 | interfaces.ifTable.ifEntry.ifIndex.2 | 2 |
| VPN-B | | ... | ... |

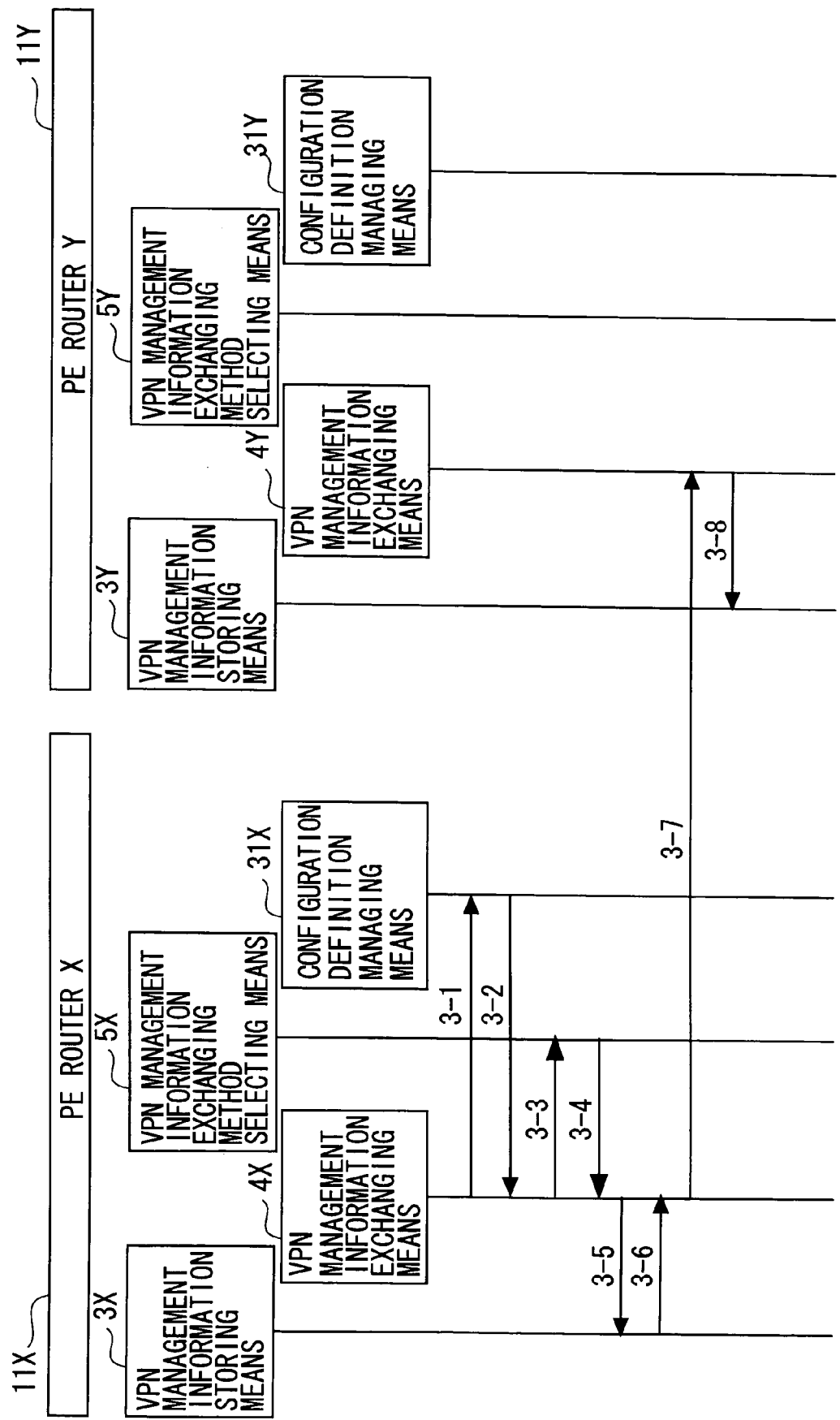

NETWORK MANAGEMENT SYSTEM, AND NETWORK MANAGEMENT METHOD

BACKGROUND OF THE INVENTION

The present invention relates to a management technology for a user network connected to a virtual private network (VPN).

In recent years, when an enterprise connects Local Area Networks (LANs) of its business sites such as headquarters and branch offices to one another, instead of private lines provided by a telecommunication carrier and a Wide Area Network (WAN) using frame relays, Virtual Private Network (VPN) services using the Internet have been utilized.

The most widespread protocol for managing the networks for use in these services is the Simple Network Management Protocol (SNMP) defined by Request For Comment (RFC) 1157 managed by the Internet Engineering Task Force (IETF). The SNMP is composed of SNMP agents which reside in network instruments to be managed and an SNMP manager which manages the networks.

Each SNMP agent manages information of the network instrument as a Management Information Base (MIB). The MIB is an aggregate of variables which indicate a state of the instrument constituting each network or variables which manage such an instrument. As the MIB, there are a standard MIB defined by the RFC and an original MIB different depending on each vendor. The SNMP manager acquires this MIB from each SNMP agent, or is notified of a Trap which is failure information from the SNMP agent, and thus determines current states of the instruments to be managed, thereby managing the networks. Note that, in order to notify the SNMP manger of the Trap, the SNMP provides a function to enable a network administrator to make a program such that specific information is transmitted when a certain event occurs.

In FIG. 1, a typical configuration example of a conventional Internet Protocol-Virtual Private Network (IP-VPN) environment is shown. In a certain site 101, there are a plurality of user networks 13A, 13B, and 13C, for which communication services of VPN-A, VPN-B, and VPN-C are provided in order to be connected to user networks in other sites. In order to connect the networks to one another through the VPNs, there are a Provider Edge (PE) router 11 which maintains VPN routing information, and Customer Edge (CE) routers (12A, 12B, 12C, and the like) which are connected to the PE router 11 for each of the user networks (13A, 13B, 13C, and the like) and exchange the routing information therewith.

In FIG. 1, in order that the telecommunication carrier who provides the VPN services performs a network management according to the SNMP, an operation management server 10 installed in an IP-VPN network 70 manages the PE router 11 in the network. Specifically, an SNMP agent 21 in the PE router 11 manages configuration information of interfaces/paths and failure information as an MIB 40, and an SNMP manager which functions as a network management manger 200 of the operation management server collects the MIB 40, or receives a Trap from the PE router 11.

Here, in FIG. 1, it is assumed that a failure is detected in the SNMP agent 21 of the PE router 11. When some failure occurs in the PE router 11, the Trap is notified from the SNMP agent 21 of the PE router 11, and thus the SNMP manger of the operation management server 10 can grasp that the failure has occurred in the VPN. However, when a spot causing the failure occurrence is in the CE router 12A and the like of the user networks, in general, there is no unit for acquiring detailed information such as which of the CE routers 12A to 12C a problem is present in or which of the VPNs relating to the user networks 13A to 13C the failure is occurring in. This is because an MIB which associates the VPN and the user network 13A and the like with each other is not defined in the RFC standard MIB.

Hence, in order to acquire such detailed information, it is necessary for the SNMP manger to collect the MIBs original to the CE routers 12A to 12C. Therefore, when using the CE routers 12A to 12C of vendors different for each of the user networks 13A to 13C, unless the SNMP manger is ready for the MIB or Trap original to each router vendor, the SNMP manager cannot manage the user networks 13A to 13C. Moreover, because of such circumstances, there is a problem in that it is difficult to collectively manage all of the user networks by use of the operation management server 10.

As technologies proposed as solutions for such problems, those described in the following documents are known.

[Patent document 1] In a technology described in this document, in order to perform a collective management from one integrated management system by use of the standard MIB, a conversion table for converting an expansion MIB present for each of the vendors into the standard MIB is provided in the SNMP manager. Therefore, when the conversion table is created, it is necessary for the SNMP manger to be ready for the expansion MIB of each of the vendors.

[Patent document 2] In a technology described in this document, in order to manage a plurality of LANs coupled to one another by a WAN, a sub manager is placed between the agent and the manager, and MIB information acquired from the agent located at a lower hierarchy is reconstructed in the sub manager, and provided to the manager. However, in this document, there is no disclosure regarding the problem, that is, regarding how the MIBs which associate the VPN and the user networks with each other is to be handled.

[Patent document 3] In this document, a technology regarding enhanced security in the user networks is proposed. However, in this technology, information collection from each of the user networks is performed in the operation management server. Therefore, it is necessary for the management server to be ready for the expansion MIB of each of the vendors.

Moreover, as technologies regarding the network management, which solve the relating problems, there are the following ones.

[Patent document 4] In a technology described in this document, an MLPS-VPN monitoring system logs in the PE router, and confirms only activation states of the CE routers connected to the PE router. However, in this technology, the standard MIBs of the CE routers, which are the detailed information regarding the user networks, cannot be collected.

[Patent document 5] In a technology described in this document, for the purpose of quality control, information such as a flow rate of packets in the IP-VPN network are collected from the PE router, and a flow rate thereof in the future and the like are predicted. Information collection for the MIBs regarding the user networks from the CE routers is not considered, and accordingly, the user networks cannot be managed.

[Patent document 6] In a technology described in this document, in order to prevent a wrong recognition of a failure due to packet loss during communication, management agents exchange information with each other, and the manager collects the information from the plurality of agents. It is necessary to collect the MIBs from the plurality of agents, and a general SNMP manager cannot be used. Moreover, when this technology is applied to the IP-VPN network, it is not considered that this technology should be ready for each VPN, and accordingly, when the vendors of the CE routers are different from one another, it becomes necessary for the SNMP manager to be ready for each of the VPNs.

[Patent document 1]
Japanese Laid-open Patent No. Hei 9-51347
[Patent document 2]
Japanese Laid-open Patent No. 2002-140240
[Patent document 3]
Japanese Laid-open Patent No. 2002-252631
[Patent document 4]
Japanese Laid-open Patent No. 2002-281084
[Patent document 5]
Japanese Laid-open Patent No. 2003-69644
[Patent document 6]
Japanese Laid-open Patent No. 2003-244144

SUMMARY OF THE INVENTION

It is an object of the present invention to solve the problems, and to provide a technology for collectively managing user networks connected to a virtual private network (VPN) without such time and effort necessary for an operation management server to be ready for an expansion MIB for each of vendors.

In order to solve the problems, the present invention has adopted the following unit. Specifically, the present invention relates to a network management system, including: a first edge router which provides a network with a virtual private network function whose utilization is limited to each of user groups and connects at least one network constituted for each of the user groups to the virtual private network; an operation management server which is connected to the first edge router and manages the virtual private network and the network constituted for each of the user groups; and a second edge router which connects to the first edge router, the second edge router being included in the network constituted for each of the user groups, wherein the first edge router includes: collecting unit for collecting management information regarding constituent elements of the network constituted for each of the user groups from the second edge router on the network constituted for each of the user groups, unit for storing the management information in correspondence with the virtual private network for each of the user groups, and unit for returning the management information when receiving, from the operation management server, a request for the management information brought in correspondence with the virtual private network for each of the user groups, and the operation management server includes requesting unit for designating the virtual private network for each of the user groups and requesting the first edge router to return the management information regarding the constituent elements of the network constituted for each user group connected to the virtual private network.

According to the present invention, the first edge router collects the management information regarding the constituent elements of the network constituted for each of the user groups from the second edge router on the network constituted for each of the user groups, stores the management information in correspondence with the virtual private network for each of the user groups, and returns the management information when receiving, from the operation management server, the request for the management information brought in correspondence with the virtual private network for each of the user groups. Hence, the operation management server can acquire the management information by designating the virtual private network and requesting the carrier's side edge router to return the management information regarding the constituent elements of the network constituted for each user group connected to the virtual private network.

Preferably, the network management system may be configured such that the operation management server constitutes a private network independent of the network constituted for each of the user groups with the first edge router, and when requesting the management information brought in correspondence with the virtual private network, designates the virtual private network by a virtual address which is made to correspond to the virtual private network and is identifiable on the private network, and the collecting unit of the first edge router includes unit for converting the virtual address into a second edge router address which is an address of the second edge router on the general network, and unit for accessing the second edge router by the second edge router address.

According to the present invention, when requesting the management information, the operation management server designates the virtual private network by the virtual address which is made to correspond to the virtual private network and is identifiable on the private network. Meanwhile, the first edge router converts the virtual address into the second edge router address which is the address of the second edge router on the general network, and accesses the second edge router. Hence, it is unnecessary for the operation management server to recognize a specific configuration of the network constituted for each user group, an actual address on the network constituted for each group, addresses of the instruments on the network constituted for each user group, the addresses being defined by the general network, and the like. For a user on the network constituted for each user group, it is possible to indirectly provide the management information through the second edge router and the first edge router without providing such specific information to the operation management server.

Preferably, the network management system may be configured such that the first edge router further includes information exchanging unit for exchanging the management information stored in correspondence with the virtual private network for each of the user groups with the other first edge router.

According to the present invention, the plurality of first edge routers exchange the management information with each other, and accordingly, the operation management server can acquire the management information from any of the first edge routers.

Preferable, the network management system may be configured such that the first edge router further includes unit for setting communication unit when the management information is exchanged by the information exchanging unit for the virtual private network for each of the user groups. According to the present invention, the communication unit when the management information is exchanged can be set, and accordingly, the management information can be exchanged by the communication unit and according to communication quality in response to a request of the user.

Moreover, the present invention may be a network management method in which a computer and other devices, machines, and the like, which are associated with one another on a network, execute any of the processing described above. Moreover, the present invention may be a program which allows the computer and the other devices, the machines, and the like to realize any of the functions described above. Furthermore, the present invention may be one in which such a program is recorded on a recording medium readable by the computer and the like.

According to the present invention, the user networks connected to the virtual private networks (VPNs) can be collectively managed without such time and effort necessary for the operation management server to be ready for the expansion MIB for each of the vendors.

DESCRIPTION OF THE DRAWINGS

FIG. 1 is a diagram showing a typical configuration example of a conventional Internet Protocol-Virtual Private Network (IP-VPN) environment.

FIG. 2 is a principle diagram on an information system according to an embodiment of the present invention.

FIG. 3 is a system configuration diagram of an information system according to a first embodiment of the present invention.

FIG. 4 is a diagram showing an MIB management table of VPN management information storing unit 3.

FIG. 7 is a diagram showing a configuration of an MIB management table managed for each site.

FIG. 11 is a sequence diagram showing a network management of the information system.

DETAILED DESCRIPTION OF THE INVENTION

Figure 5:
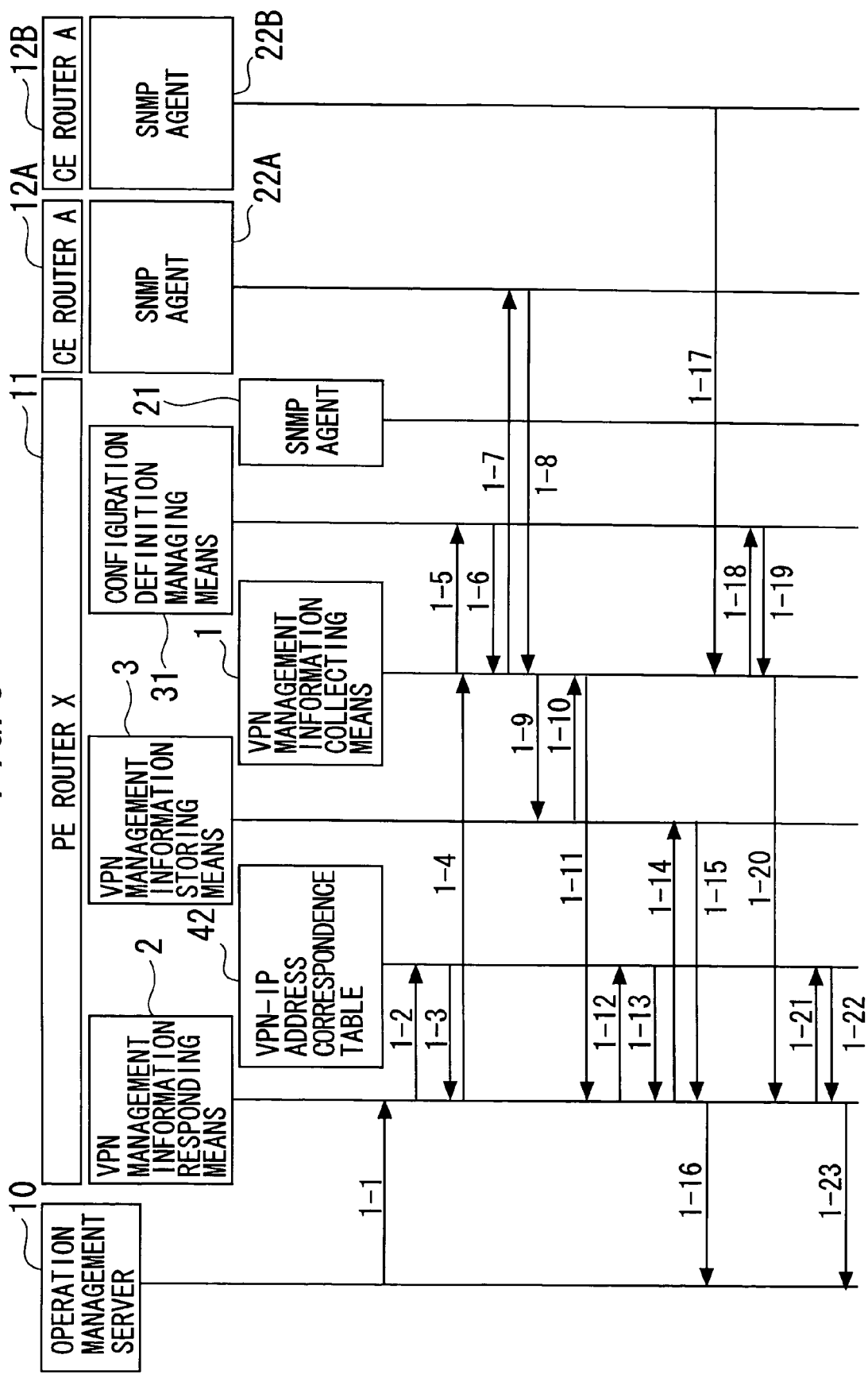
FIG. 5 is a sequence diagram showing a network management of the information system.

An information system according to a best mode of carrying out the present invention (hereinafter, referred to as an embodiment) is described below with reference to the drawings. A configuration of the embodiment to be described below is an illustration, and the present invention is not limited to the configuration of the embodiment.

<<Principle of System>>

FIG. 2 is a principle diagram of the information system. As shown in FIG. 2, in theory, the information system includes a plurality of PE routers 11 (corresponding to first edge routers) constituting an IP-VPN, CE routers 12 (corresponding to second edge routers) which connect the PE routers 11 to a user network 13, and an operation management server 10 which manages a VPN and the user network 13 coupled thereto by the VPN.

By a carrier's private IP network, the operation management server 10 and the PE routers 11 are connected to each other, and the plurality of PE routers 11 are connected to one another. The VPN by such a carrier's private IP network can be composed, for example, of a Multi Protocol Label Switch (MPLS). Specifically, in a PE router 11A which is an entrance of the carrier's private IP network, a fixed-length label is assigned to a packet from the user network 13. The packet to which the label is assigned is transferred through the carrier's private IP network according to the label. Then, in a PE router 11B which is an exit of the carrier's private IP network, the label is deleted, and the packet is transferred to a target user network. Note that, in this embodiment, when the plural PE routers 11 are distinguished from one another, the PE routers 11 are referred to as the PE routers 11A and 11B, for example. Moreover, when these are generically referred to, they are called the PE routers 11.

In the operation management server 10, an SNMP manager 20 which manages the network carrier's private IP network operates. Each of the PE routers 11 has an SNMP agent 21 which reports a state of the PE router 11 to the SNMP manger 20 on the operation management server 10. The SNMP agent 21 collects an MIB related to the PE router 11 itself. Moreover, the PE router 11 has configuration definition managing unit 31 for managing configuration information regarding the VPN.

Each of the CE routers 12 has a function to connect the user network 13 to the PE router 11. An SNMP agent 22 also operates on the CE router 12, and reports management information on the CE router 12 in response to a request from a request source (for example, the PE router 11).

In the information system, in order to collectively manage, in the operation management server 10, the user networks 13 which utilize the VPN, as shown in FIG. 2, VPN management information collecting unit 1, VPN management information responding unit 2, VPN management information storing unit 3, VPN management information exchanging unit 4, and VPN management information exchanging method selecting unit 5 are provided in the PE router 11 connected to the operation management server 10. Details of these constituent elements and a processing procedure by these constituent elements are described below.

(1) VPN Management Information Collecting Unit 1 (Corresponding to Collecting Unit)

The VPN management information collecting unit 1 refers to the information regarding each VPN from the configuration definition managing unit 31 of the PE router 11, collects an MIB from the SNMP agent 22 of the CE router 12 connected to the user network 13 which utilizes the VPN, and stores the MIB in the VPN management information storing unit 3 for each VPN.

Moreover, the VPN management information collecting unit 1 determines to which of the user networks 13 a Trap received from the CE router 12 relates with reference to the configuration definition managing unit 31. Then, the VPN management information collecting unit 1 notifies the Trap to the VPN management information responding unit 2 together with information which specifies the user network.

(2) VPN Management Information Responding Unit 2 (Corresponding to Returning Unit)

The VPN management information responding unit 2 serves as the SNMP agent 22 for each user network 13. The VPN management information responding unit 2 holds a virtual IP address as the SNMP agent for each VPN. The virtual IP address is set as a private address in the carrier's private IP network.

In the information system, the virtual IP address is designated when the SNMP manger 20 of the operation management server 10 requests the MIB corresponding to the VPN. Then, the PE router 11 determines the VPN corresponding to the virtual IP address and the CE router 12 of the user network 13 connected to the VPN concerned, collects the MIB information from the CE router 12, and returns the MIB information to the operation management server 10. Therefore, from the SNMP manger 20 of the operation management server 10, the SNMP agent looks as if it were present for each of the above-described user networks 13.

Specifically, the operation management server 10 requests the MIB from the PE router 11 by use of the above-described virtual IP address as a destination address. Meanwhile, the VPN management information responding unit 2 of the PE router 11 has a VPN-IP address correspondence table 42 which defines correspondences between the above-described IP address and the VPN. Upon receiving the MIB request from the operation management server 10, the VPN management information responding unit 2 refers to the VPN-IP address correspondence table 42, acquires, from the VPN management information storing unit 3, the MIB of the VPN corresponding to the destination IP address when the SNMP manager 20 requests the MIB, and returns the MIB concerned to the SNMP manager 20. Moreover, the VPN management information responding unit 2 changes a transmission source IP address of the Trap notified by the VPN management information collecting unit 1 into the virtual IP address corresponding to the VPN, and transmits the virtual IP address to the SNMP manager 20.

(3) VPN Management Information Storing Unit 3 (Corresponding to Storing Unit)

The VPN management information storing unit 3 manages the MIB collected by the VPN management information collecting unit 1, and passes the MIB to the VPN management information responding unit 2 when receiving the MIB request from the SNMP manger 20. The VPN management information storing unit 3 has a table (referred to as an MIB management table 41) which manages the MIB for each site where the user network is present and for each VPN to which the user network is connected.

(4) VPN Management Information Exchanging Unit 4 (Corresponding to Information Exchanging Unit)

The VPN management information exchanging unit 4 transmits the MIB managed in the VPN management information storing unit 3 to the other PE router 11B which constitutes the VPN in order to share the MIB with the other PE router 11B. Moreover, the VPN management information exchanging unit 4 stores, in the VPN management information storing unit 3, an MIB received from the VPN management information exchanging unit 4 in the other PE router 11B. Note that, when transmitting/receiving the MIBs, the VPN management information exchanging unit 4 performs the transmission/reception by communication unit designated by a user with reference to the VPN management information exchanging method selecting unit 5.

(5) VPN Management Information Exchanging Method Selecting Unit 5 (Corresponding to Communication Unit Setting Unit)

In order to enable the user to select the communication unit for the MIB transmission/reception between the PE routers 11 by the VPN management information exchanging unit 4, the VPN management information exchanging method selecting unit 5 has a table (referred to as an information exchanging unit table 50) which holds information indicating communication unit designated by the user in advance.

(6) Network Management Processing Procedure

In the IP-VPN network, the plural user networks 13 which utilize the VPN for the connection between the sites are present. As described above, in usual, the PE routers 11, the user networks 13, and the CE routers 12 connected to the PE routers 11, are present for the purpose of making connections between the networks of the other sites. In order to manage the user networks 13, the operation management server 10 having the SNMP manager 20 is connected to the PE router 11 on the IP-VPN network (on the carrier's private IP network), and manages the user networks 13.

In the PE router 11, the VPN management information collecting unit 1, the VPN management information responding unit 2, and the VPN management information storing unit 3 are provided. In the SNMP manger 20 present in the operation management server 10, the virtual IP address (virtual private address (corresponding to a virtual address)) corresponding to the SNMP agent for each user network 13 is registered in advance. This IP address is also managed in the VPN-IP address correspondence table 42 of the VPN management information responding unit 2.

When requesting the MIB of the user network 13 which utilizes the VPN, the SNMP manager 20 designates the virtual IP address of the SNMP agent corresponding to the VPN, and requests the virtual IP address from the PE router 11. The PE router 11 receives the request in the VPN management information responding unit 2. The VPN management information responding unit 2 which has received the request refers to the VPN-IP address correspondence table 42, and determines from which VPN the MIB is requested. Then, the VPN management information responding unit 2 issues a request to obtain the MIB of the designated VPN to the VPN management information collecting unit 1.

The VPN management information collecting unit 1 in the PE router 11 refers to the configuration definition managing unit 31 (corresponding to unit for converting the virtual IP address into a second edge router address) of the PE router 11, and acquires the IP address of the CE router 12 connected to the user network 13 which utilizes the designated VPN. The VPN management information collecting unit 1 refers to these pieces of information, functions as the SNMP manager, and collects the MIB from the SNMP agent 22 of the CE router 12. The VPN management information collecting unit 1 stores the MIB collected for each VPN in the VPN management information storing unit 3. The VPN management information storing unit 3 has the MIB management table 41 for managing the MIB for each VPN. When the collection of the MIB of the designated VPN is completed, the VPN management information collecting unit 1 notifies the VPN management information responding unit 2 that the collection of the MIB is completed.

The VPN management information responding unit 2 which has received the notification of completion acquires the MIB of the designated VPN from the VPN management information storing unit 3, refers to the VPN-IP address correspondence table 42, and returns, as the transmission source IP address, the virtual IP address for the designated VPN to the SNMP manger 20.

The VPN management information responding unit 2 holds the virtual IP address corresponding to the VPN in the VPN-IP address correspondence table 42. Accordingly, the SNMP manger 20 can collect the MIB as if the SNMP agent 21 were present for each user network 13. It becomes possible for the SNMP manger 20 to manage the user network 13 in a similar way to other network devices such as routers by the SNMP agent 21 which functions independently for each user network 13.

Moreover, the standard MIB of the CE router 12 is collected in the PE router 12, and accordingly, it becomes unnecessary for the SNMP manger 20 to be ready for an MIB original to a router vendor. Hence, a general one can be used as the SNMP manger 20. Note that, in a conventional system, the standard MIB collectable by the SNMP manger 20 is one (MIB 40 in FIG. 2) transmitted from the SNMP agent 21 of the PE router 11, and in general, there has been no unit for collecting the standard MIB from the user network 13 connected to the VPN. This is because an MIB which associates the VPN and the user network with each other is not defined in the RFC standard MIB.

(7) Information Exchange Processing Between PE Routers 11

The VPN management information exchanging unit 4 acquires the IP address of the other PE router 11B constituting the same VPN from the configuration definition managing unit 31, and transmits the MIB managed by the VPN management information storing unit 3 to the PE router 11B concerned. Meanwhile, the PE router 11A which has received the MIB from the other PE router 11B updates contents of the VPN management information storing unit 3. The MIB is transmitted/received between all of the PE routers 11 constituting the same VPN.

Thus, the MIB has only to be acquired from one PE router 11 when the operation management server 10 collects the MIB of the user network 13. Moreover, when a failure of the one PE router 11A is detected through the SNMP manger 20, the acquisition request of the MIB is performed for the other PE router 11B, thus making it possible to acquire the MIB of the user network 13. Thus, highly reliable user network management can be realized.

(8) Designation of Communication Unit when Information is Exchanged Between PE Routers 11

The VPN management information exchanging method selecting unit 5 is provided in the above-described PE router 11. The VPN management information exchanging method selecting unit 5 manages the communication unit for the transmission/reception of the MIBs between the PE routers 11, which is designated by the user in advance, for each user who utilizes the VPN. The VPN management information exchanging unit 4 refers to the communication unit for the MIBs for each VPN in the information exchanging unit table 50 of the VPN management information exchanging method selecting unit 5, and transmits/receives the MIBs by the communication unit. Thus, it becomes possible for the communication carrier to provide different services such as to provide a user's band as the above-described communication unit to a user who requires an inexpensive service and to provide a private line where the transmission/reception of the MIB is performed for sure for a user who requires reliability.

First Embodiment

A first embodiment of the present invention is described with reference to FIGS. 3 to 5. FIG. 3 is a system configuration diagram of an information system according to the first embodiment of the present invention. Basically, the information system includes similar constituent elements to the constituent elements shown in FIG. 2 showing the above-described principle of the invention. Hence, in this embodiment, the same reference numerals as those in FIG. 2 are given to the same constituent elements as those in FIG. 2, and description thereof is omitted.

Note that, in FIG. 3, three networks 13A, 13B, and 13C are shown as the user networks. In this embodiment, it is assumed that the user networks 13A, 13B, and 13C are connected to networks of the other sites by VPNs which are a VPN-A, a VPN-B, and a VPN-C.

Moreover, in this embodiment, CE routers 12A, 12B, and 12C are provided in the user networks 13A, 13B, and 13C, respectively. Furthermore, SNMP agents 22A, 22B, and 22C operate in the CE routers 12A, 12B, and 12C, respectively.

The PE router 11 connected to the CE routers 12A, 12B, and 12C provided in the user networks 13A, 13B, and 13C which utilize the VPN includes the VPN management information collecting unit 1, the VPN management information responding unit 2, the VPN management information storing unit 3, the SNMP agent 21 which collects the MIB 40 of the PE router 11, and the configuration definition managing unit 31.

The operation management server 10 which has the SNMP manger 20 is connected to the PE router 11 by a carrier's private IP network. In this embodiment, the carrier's private IP network provides the VPN service. In the SNMP manger 20, an IP address present for each of the user networks 13A to 13C for collecting the MIBs of the user networks 13A to 13C is registered in advance.

The VPN management information responding unit 2 of the PE router 11 manages a table (VPN-IP address correspondence table 42) which defines correspondences between these virtual IP addresses and the VPNs defined in the configuration definition managing unit 31.

The configuration definition managing unit 31 has information which defines the configuration of the VPNs provided in the carrier's private IP network. For example, the information includes names of the carrier's side edge router 11, and the CE routers 12A, 12B, and 12C which exchange path information with the carrier's side edge router 11 of each VPN, IP addresses of the CE routers 12A, 12B, and 12C, and the like. In the example of FIG. 3, a table which defines the IP addresses of the CE routers 12A, 12B, 12C, and the like as the information held by the configuration definition managing unit 31 is shown.

FIG. 5 is a sequence diagram showing network management of the information system. Processing of the information system is described below with reference to FIGS. 3 and 5. First, in order to manage the user network 13A, the SNMP manger 20 of the operation management server 10 designates the virtual IP address A corresponding to the user network 13A as a destination IP address, and requests the MIB from the PE router 11 (FIG. 5, 1-1).

The VPN management information responding unit 2 which has received the request for the MIB refers to the VPN-IP address correspondence table 42 (FIG. 5, 1-2), and confirms that the requested one is the MIB of the VPN-A (FIG. 5, 1-3). The VPN management information responding unit 2 issues a request to acquire the MIB of the VPN-A to the VPN management information collecting unit 1 (FIG. 5, 1-4).

The VPN management information collecting unit 1 in the PE router 11, which has received the request, first refers to the configuration definition managing unit 31 (FIG. 5, 1-5). The VPN management information collecting unit 1 refers to the IP address of the CE router 12A connected to the user network 13A which utilizes the VPN-A in the configuration definition managing unit 31 (FIG. 5, 1-6).

In order to acquire the MIB of the VPN-A using the IP address referred to, the VPN management information collecting unit 1 requests the MIB from the SNMP agent 22A of the CE router 12A (FIG. 5, 1-7). The VPN management information collecting unit 1 which executes the processing corresponds to unit for accessing a second edge router. The MIB acquired from the SNMP agent 22A of the CE router 12A (FIG. 5, 1-8) is stored as the MIB of the VPN-A in the VPN management information storing unit 3 (FIG. 5, 1-9).

The VPN management information storing unit 3 manages the MIB of each of the CE routers 12A and the like, which is acquired in the VPN management information collecting unit 1, as the MIB of each VPN (FIG. 5, 1-10).

In FIG. 4, the MIB management table 41 of the VPN management information storing unit 3 is shown. As shown in FIG. 4, the MIB management table 41 summarizes names of the VPNs for identifying the VPNs, names of the MIBs for identifying the MIBs, and MIB values corresponding to the names of the MIBs. Specifically, the VPN management information storing unit 3 stores the MIBs to be partitioned for each VPN. Hence, the VPN management information storing unit 3 can provide the MIB for each VPN to be requested in response to the request from the VPN management information responding unit 2.

After the completion of the collection/storage of the MIBs, the VPN management information collecting unit 1 notifies the VPN management information responding unit 2 that the collection of the MIBs is completed (FIG. 5, 1-11).

The VPN management information responding unit 2 which has received the notification of the MIB collection completion refers to the VPN-IP address correspondence table 42 (FIG. 5, 1-12), and acquires the IP address A that is the virtual IP address of the SNMP agent, which corresponds to the VPN-A (FIG. 5, 1-13). Moreover, in order to transmit the MIB requested by the SNMP manger 20, the VPN management information responding unit 2 requests the MIB of the VPN-A from the VPN management information storing unit 3, and acquires the MIB (FIG. 5, 1-14 and 1-15). Then, the VPN management information responding unit 2 sets the transmission source IP address of the MIB as the IP address A, and returns the IP address A to the SNMP manger 20 (FIG. 5, 1-16). A similar procedure is performed also in the case of collecting the MIBs regarding the VPN-B and the VPN-C.

Meanwhile, when the Trap is issued as failure information from the CE router 12A or the like connected to the user network 13A or the like, the VPN management information responding unit 2 notifies the operation management server 10 of the issuance through the following processing. For example, in the SNMP agent 22B of the CE router 12B, the IP address of the PE router 11 is registered in advance as the SNMP manager to which the Trap is transmitted.

When the Trap is issued to the PE router 11 from the CE router 12B connected to the user network 13B, the Trap is received in the VPN management information collecting unit 1 of the PE router 11 (FIG. 5, 1-17). The VPN management information collecting unit 1 refers to the configuration definition managing unit 31 (FIG. 5, 1-18), and the user network 13B to which the CE router 12B having issued the Trap is connected confirms that the VPN-B is being used (FIG. 5, 1-19). Thereafter, the Trap is transferred to the VPN management information responding unit 2 (FIG. 5, 1-20). The Trap is the Trap regarding the VPN-B, and accordingly, the VPN management information responding unit 2 refers to the VPN-IP address correspondence table 42 (FIG. 5, 1-21), and sets the virtual IP address B of the SNMP agent, which corresponds to the VPN-B, as the transmission source IP address (FIG. 5, 1-22). Then, the VPN management information responding unit 2 sends the Trap as the Trap from the VPN-B to the SNMP manger 20 of the operation management sever 10 (FIG. 5, 1-23).

As described above, according to the information system of this embodiment, the SNMP manager 20 of the operation management server 10 designates the VPN by using the virtual IP address (private address) in the carrier's private IP network, and requests the MIB of the VPN concerned from the PE router 11. Therefore, the operation management server 10 which manages the plural user networks 13A to 13C and the like can manage the whole network by acquiring the MIBs of the user networks 13A to 13C connected thereto by the VPNs without directly recognizing the details of the user networks 13A to 13C, for example, the IP addresses of the user networks 13A to 13C, the IP addresses of the CE routers 12A to 12C, and the like.

Moreover, according to the information system, the VPN management information responding unit 2 converts the virtual IP addresses indicating the destinations designated from the operation management server 10 into the names of the VPNs. The VPN management information collecting unit 1 accesses the configuration definition managing unit 31 which defines the configurations of the VPNs, obtains the CE routers 12A to 12C from the names of the VPNs concerned, and further, specifies the IP addresses of the CE routers 12A to 12C. Then, the VPN management information collecting unit 1 accesses the CE routers 12A to 12C and the like by using the IP addresses of the CE routers 12A to 12C and the like, which are specified by the configuration definition managing unit 31, and collects the MIBs from the SNMP agents 22A to 22C.

Meanwhile, with regard to the Traps reported by the SNMP agents 22A to 22C of the CE routers 12A to 12C and the like, the VPN management information collecting unit 1 refers to the configuration definition managing unit 31, and reversely, converts the IP addresses of the CE routers 12A to 12C and the like into the names of the VPNs, and passes the name of the VPNs to the VPN management information responding unit 2.

Then, the VPN management information responding unit 2 returns the names of the VPNs to the virtual IP addresses corresponding to the names of the VPNs, and passes the MIBs or the Traps collected for each VPN with the virtual IP addresses set as the transmission sources to the operation management server 10.

With the configuration and the procedure as described above, the operation management server 10 can acquire the information of the plural user networks 13A to 13C for each VPN without taking into consideration the correspondence between the VPNs and the user networks. Hence, it is unnecessary for the SNMP manger 20 of the operation management server 10 to handle expanded MIBs. The SNMP manger 20 of the operation management server 10 has only to operate on the assumption that there are SNMP agents different for each of the above-described virtual IP addresses.

Meanwhile, required of the PE router 11 are the VPN management information collecting unit 1, the VPN management information responding unit 2, and the VPN management information storing unit 3. However, these unit need only to collect the MIBs or Traps of the user networks 13A to 13C corresponding to the VPNs in association with the configuration definition managing unit 31 originally provided in the PE router 11. Hence, it becomes easy to change the system for the purpose of managing the user networks 13A to 13C corresponding to the VPNs.

Second Embodiment

A second embodiment of the present invention will be described with reference to FIGS. 6 to 9. Described in the first embodiment is an example of the information system where the operation management server 10 designates the VPN by using the virtual IP address to collect the network management information such as MIBs or Traps from the PE routers 11. In this embodiment, description is made of an example of an information system where the plural PE routers 11 exchange the MIB information with each other. Other constituent elements and operations of the information system are the same as in the first embodiment. Thus, the same reference numerals are given to the same constituent elements as those in the first embodiment and their description is omitted here.

Figure 6:
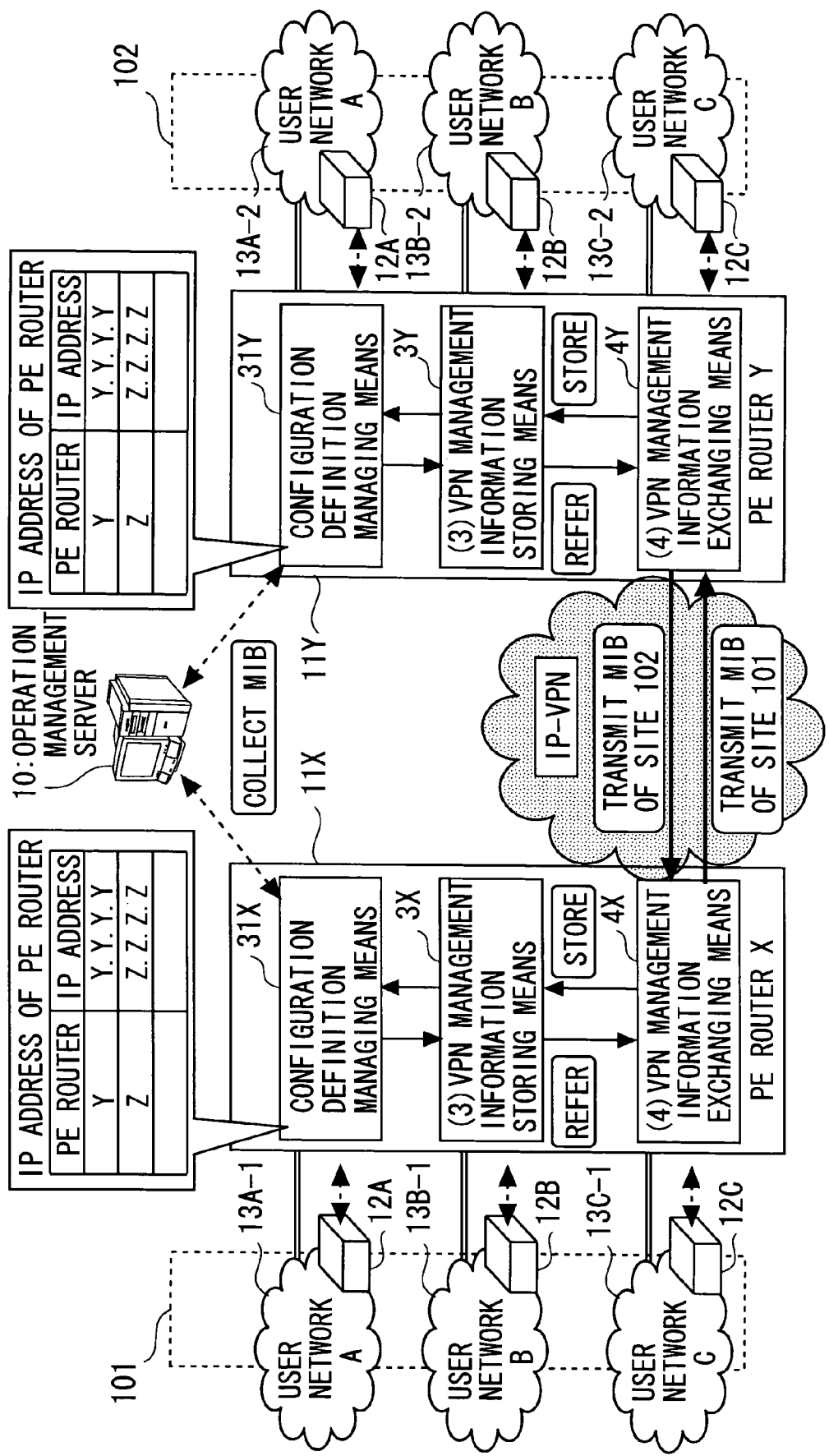
FIG. 6 is a system configuration diagram of an information system according to a second embodiment of the present invention.

FIG. 6 is a system configuration diagram of the information system according to this embodiment. In FIG. 6, a plurality of networks of two sites 101 and 102 are connected to each other through an IP-VPN 70. In the example, user networks 13A-1, 13B-1, and 13C-1 are present in the site 101. Moreover, user networks 13A-2, 13B-2, and 13C-2 are present in the site 102.

The user network 13A-1 of the site 101 and the user network 13A-2 of the site 102 are connected to each other by the IP-VPN 70. Moreover, the user network 13B-1 of the site 101 and the user network 13B-2 of the site 102 are connected to each other by the IP-VPN 70. Furthermore, the user network 13C-1 of the site 101 and the user network 13C-2 of the site 102 are connected to each other by the IP-VPN 70. Note that the user network 13A-1 of the site 101 and the user network 13A-2 of the site 102 are generically referred to as the user network 13A. The same can also apply to the user network 13B and the user network 13C.

Moreover, in this embodiment, in the case of distinguishing the PE routers 11 for each of the sites 101 and 102, the PE router 11 is called PE routers 11X and 11Y, for example, and when the PE routers 11X and 11Y are generically referred to, they are called the PE router 11. The same can also apply to configuration definition managing unit 31 (31X and 31Y), VPN management information storing unit 3 (3X and 3Y), and VPN management information exchanging unit 4 (4X and 4Y), which are constituent elements of the PE router.

On both ends of the IP-VPN 70, the two PE routers 11X and 11Y are illustrated. The PE router 11X includes the configuration definition managing unit 31X, the VPN management information storing unit 3X, and the VPN management information exchanging unit 4X. Moreover, the PE router 11Y includes the configuration definition managing unit 31Y, the VPN management information storing unit 3Y, and the VPN management information exchanging unit 4Y.

Among them, the configuration definition managing unit 31X, the VPN management information storing unit 3X, and the like are similar to those described in the first embodiment, and description thereof is omitted. Moreover, though not specifically shown in FIG. 6, the constituent elements of the PE router 11X and the PE router 11Y are basically similar to those in the case of the first embodiment.

An SNMP manager 20 registers the PE routers 11X and 11Y which function as the SNMP agents for collecting the MIBs of the user networks 13A to 13C in advance, and moreover, is set to acquire the MIBs of the user networks from the PE router 11X in usual cases. The processing procedure is similar to that in the case of the first embodiment.

The PE routers 11X and 11Y acquire the MIBs from the CE routers 12A, 12B, and 12C connected to the user networks 13A, 13B, and 13C of the sites 101 and 102, and manage the MIBs in the VPN management information storing unit 3X and 3Y. Note that the acquisition of the MIBs may be performed not only when the MIBs are requested by the SNMP manger 20 but also periodically for all of the VPNs defined in the configuration definition managing unit 31 by the VPN management information collecting unit 1.

The PE routers 11X and 11Y periodically communicate with each other in the VPN management information exchanging unit 4X and 4Y in order to collect the MIBs of the VPNs for each of the sites. Note that the MIBs in the VPN management information storing unit 3X and 3Y and the like are managed for each of the sites where the VPNs and the user networks which utilize the VPNs are present.

In FIG. 7, a configuration of the MIB management table 41 which site information is added to and is managed for each of the sites is shown. As shown in FIG. 7, as compared with the case of the first embodiment, fields which are the sites are added to the MIB management table 41 of this embodiment.

Figure 9:
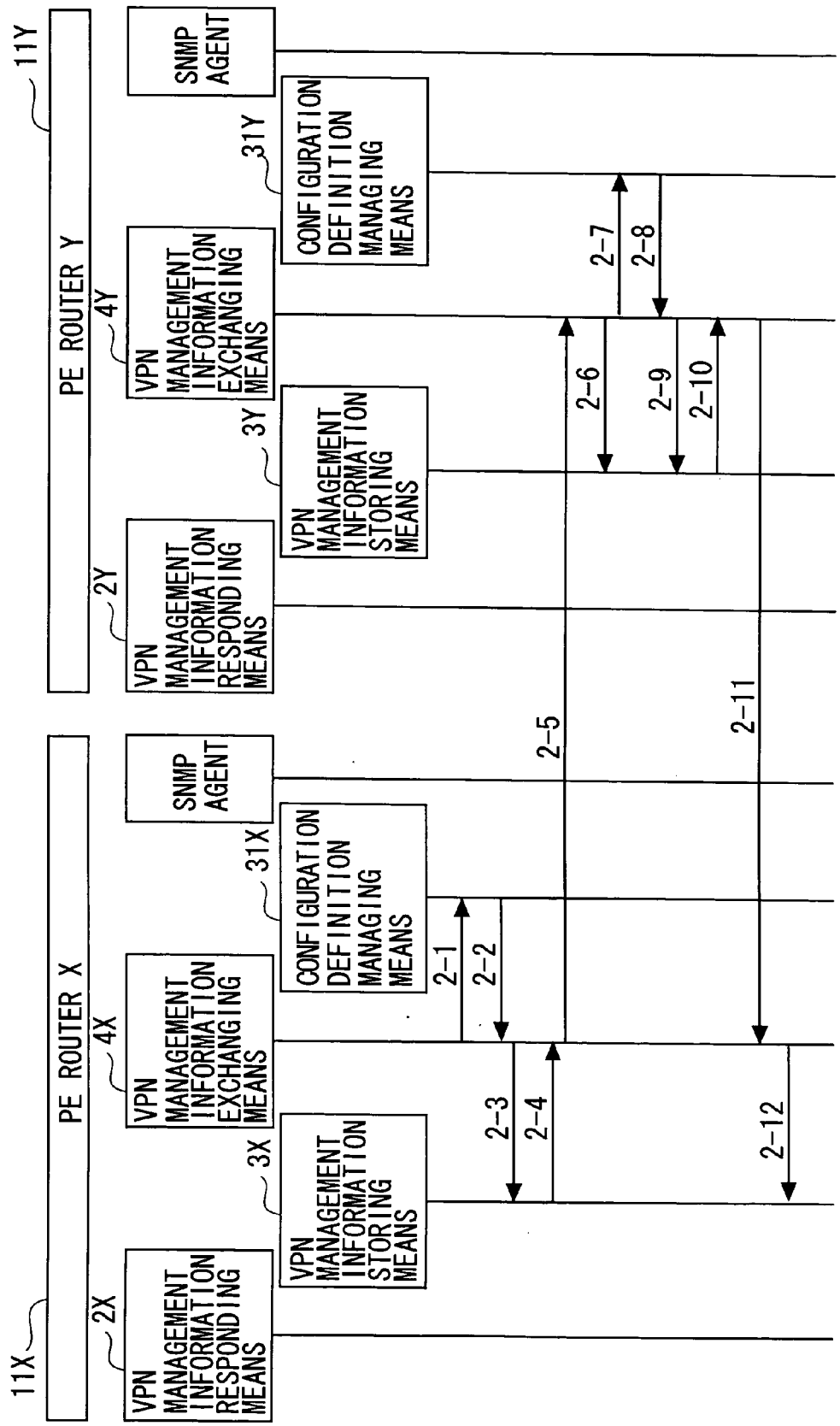
FIG. 9 is a sequence diagram showing a network management of the information system.

FIG. 9 is a sequence diagram showing the network management of the information system. Processing of the information system is described below with reference to FIGS. 6 and 9. The PE router 11X is connected to the CE routers 12A to 12C and the like of the user networks present in the site 101, and accordingly, transmits the MIBs of the site 101 according to the following procedure.

The VPN management information exchanging unit 4X first refers to the configuration definition managing unit 31X in order to know the IP address of the other PE router 11Y constituting the VPN (FIG. 9, 2-1), and acquires the IP address of the PE router Y (FIG. 9, 2-2). Thereafter, the VPN management information exchanging unit 4X refers to the VPN management information storing unit 3X (FIG. 9, 2-3), and acquires the MIBs of the VPN-A, VPN-B, and VPN-C of the site 101 (FIG. 9, 2-4).

The VPN management information exchanging unit 4X transmits the MIBs to the PE router 11Y (FIG. 9, 2-5). The VPN management information exchanging unit 4Y of the PE router 11Y receives these MIBs, and updates the MIB information of the VPN-A, VPN-B, and VPN-C of the site 101 by the VPN management information storing unit 3Y (FIG. 9, 2-6).

In a similar way to the PE router 11X, the PE router 11Y also transmits the MIBs in the VPN management information exchanging unit 4Y. The PE router 11Y transmits the MIBs of the site 102, and updates the MIBs of the site 102 in the VPN management information storing unit 3X of the PE router 11X (FIG. 9, 2-7 to 2-11). The MIBs are transmitted and received periodically in such a way, and thus the PE routers 11X and 11Y can hold the MIBs regarding all of the user networks 13A to 13C in the VPN management information storing unit 3X and 3Y.

When the SNMP manager 20 of the operation management server 10 requests the MIBs from the PE router 11X which has collected the MIBs according to the above procedure, the PE router 11X transmits the MIBs of the user networks 13A to 13C according to the procedure described in the first embodiment.

Figure 8:
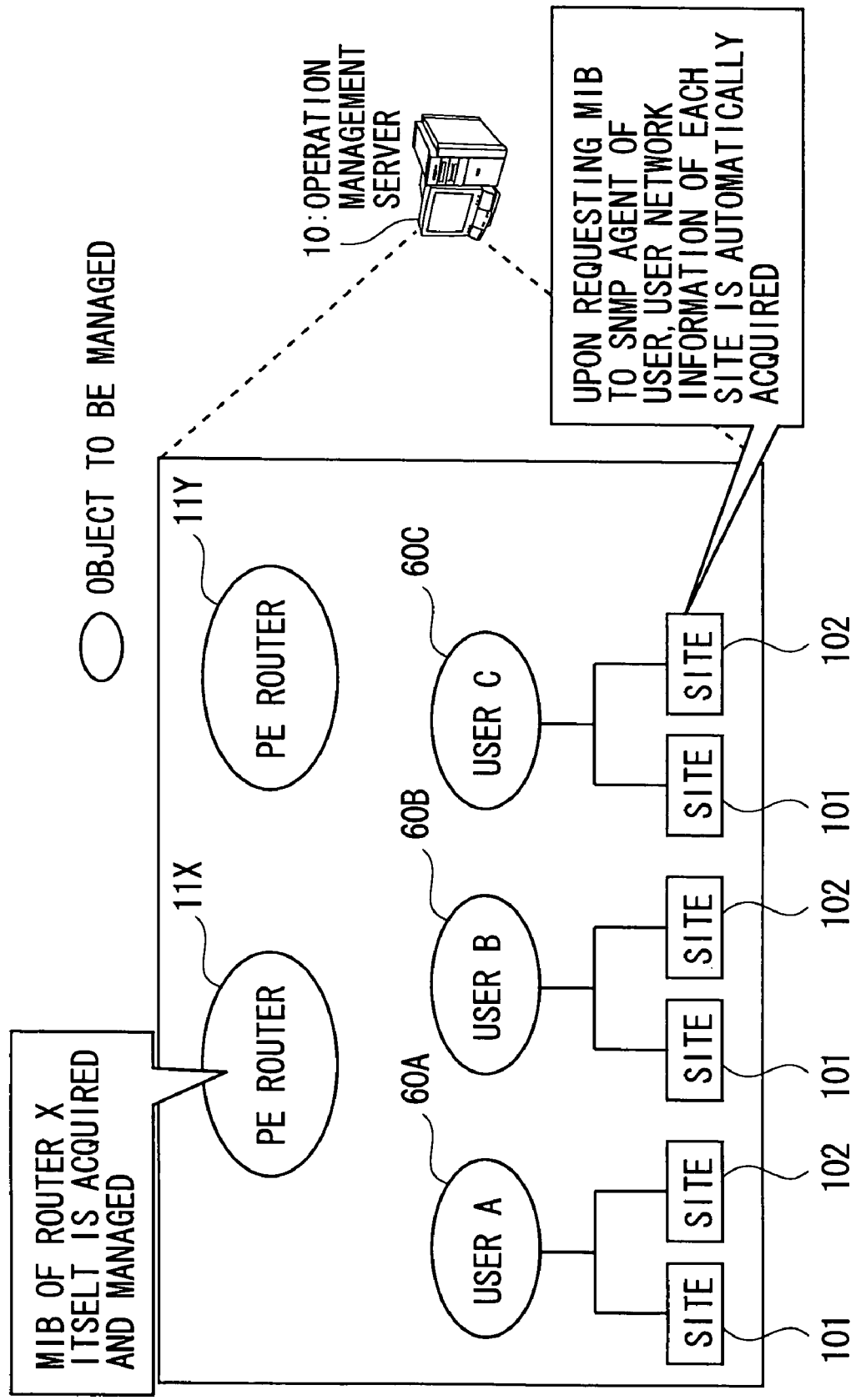
FIG. 8 is a diagram showing a concept of a management mode in the information system.

In FIG. 8, a concept of a management mode in the information system of this embodiment is shown. In the example of FIG. 8, users 60A to 60C and the like receive services to be connected to the networks which the plural sites 101 and 102 have by the VPNs. In such a utilization mode, it becomes possible for the SNMP manger 20 to manage the PE routers 11X and 11Y and the user networks 13A to 13C in the management mode as in FIG. 8. Specifically, the SNMP manager 20 can acquire the MIBs of the user networks of the respective users 60A to 60C in all of the sites 101, 102 and the like from any of the PE routers 11X and 11Y.

Moreover, for example, in the operation management server 10, setting is made in advance as a default such that the MIBs of the user networks are acquired from the PE router 11X. Then, when some failure occurs in the PE router 11X and the MIBs can not be acquired from the PE router 11X, the operation management server 10 has only to acquire the MIBs from the PE router 11Y. The plural PE routers 11X, 11Y, and the like hold the MIBs of all of the user networks, and thus the MIBs of the whole user networks can be collected from the other PE router 11Y and the like even if the failure occurs in one PE router 11X or the like, thus making it possible to manage the user networks with high reliability.

Third Embodiment

A third embodiment of the present invention will be described with reference to FIGS. 10 and 11. Described in the second embodiment is an example where the plural PE routers 11 exchange the MIB information with each other. In this embodiment, description is made of an information system having a function of enabling the user to set communication unit when the plural PE routers 11 exchange the MIB information with each other. Other constituent elements and operations of the information system are the same as in the first or second embodiment. Thus, the same reference numerals are given to the same constituent elements as those in the first or second embodiment and their description is omitted here.

Figure 10:
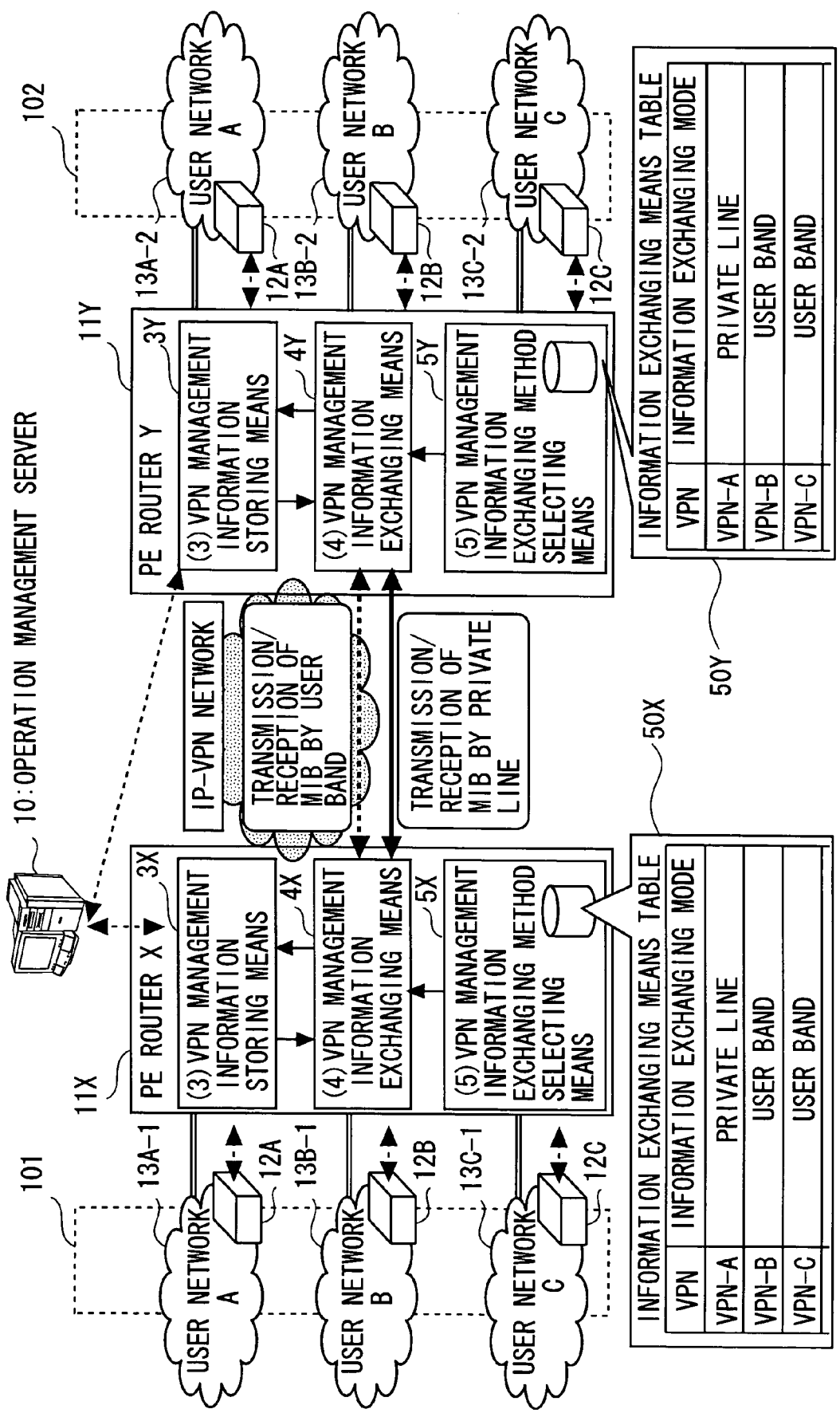
FIG. 10 is a system configuration diagram of an information system according to a third embodiment of the present invention.

FIG. 10 is a system configuration diagram of the information system of this embodiment. Users of networks which utilize the VPNs can select in advance unit of communication for exchanging the MIBs, which is performed in VPN management information exchanging unit 4X, 4Y, and the like of the PE routers 11X, 11Y, and the like. Here, a user A makes a contract with the carrier such that transmission/reception of MIBs between the PE routers 11X and 11Y are performed by a private line other than lines which the users utilize. Although the use of the private line results in a cost increase, the use ensures more highly reliable failure management. Meanwhile, users B and C make contracts with the carrier such that the transmission/reception of the MIBs between the PE routers 11X and 11Y is performed in bands assigned to the users. Although the communication using the user's band is somewhat inferior to the communication using the private line in the reliability in the failure management, the use enables the utilization of the VPNs at relatively low cost.

Communication methods of the MIBs, which are selected by each of the users, are held in information exchanging unit tables 50X and 50Y managed by VPN management information exchanging method selecting unit 5X and 5Y in the PE routers 11X and 11Y.

In FIG. 11, a control sequence for executing the exchange of the MIBs between the PE routers 11X and 11Y is shown. The VPN management information exchanging unit 4X of the PE router 11X first refers to configuration definition managing information 31X (FIG. 11, 3-1), and collects an IP address of the PE router 11Y to which the communication is to be made, and defined VPN information (FIG. 11, 3-2). Here, when the VPN-A, VPN-B, and VPN-C are defined, the VPN management information exchanging unit 4X refers to the VPN management information exchanging method selecting unit 5X in order to transmit the MIB regarding the VPN-A (FIG. 11, 3-3 and 3-4).

The MIB regarding the user A who utilizes the VPN-A is set to be transmitted by the private line. Accordingly, the VPN management information exchanging unit 4X refers to VPN management information storing unit 3X (information exchanging unit table 50X of FIG. 10) (FIG. 11, 3-5 and 3-6), and transmits the MIB regarding the VPN-A from the private line to the PE router 11Y (FIG. 11, 3-7).

The VPN management information exchanging unit 4Y of the PE router Y stores the received MIB as an MIB of the VPN-A in the VPN management information storing unit 3Y (FIG. 11, 3-8).

Note that, when a failure occurs in the communication method held in the VPN management information exchanging method selecting unit 5X and the like and the transmission/reception of the MIB cannot be performed, the VPN management information exchanging unit 4X performs the transmission/reception of the MIB by a communication method other than the designated communication method. When a failure occurs in the private line designated by the user A and the MIB fails to be transmitted, the VPN management information exchanging unit 4X and the like transmit the MIB by use of the band of the user.

In a similar way, the MIBs of the VPN-B and VPN-C are transmitted to the PE router 11 (FIG. 11, 3-3 to 3-8). The information to the effect that the VPN-B and VPN-C transmit MIBs by use of the bands of the users is held in the VPN management information exchanging method selecting unit 5X. Accordingly, the transmission/reception of the MIBs by use of the bands of the users are performed in the VPN management information exchanging unit 4X. Moreover, also in communication from the PE router 11Y to the PE router 11X, similar processing (FIG. 11, 3-1 to 3-8) is repeated.

As described above, according to the information system of this embodiment, for example, the communication unit for exchanging the MIBs between the plural PE routers 11 can be designated in response to requests of the users.

According to the present invention, the user networks connected to the virtual private networks (VPNs) can be collectively managed without such time and effort necessary for the operation management server to be ready for the expansion MIB for each of the vendors.

What is claimed is:

1. A network management system, comprising:
 a first edge router which connects at least one of network of each of one or more user groups in a virtual private network;
 an operation management server which is connected to the first edge router and manages the virtual private network (VPN) and the networks of each of one or more user groups; and
 a second edge router which connects to the first edge router through the virtual private network, the second edge router being included in each of the networks of the networks of the one or more user groups,
 wherein the first edge router includes:
 a collecting unit collects management information regarding constituent elements of the network of the one or more user groups from the second edge router,
 a unit stores the management information of the one or more user groups in the virtual private network, and
 a unit returns the management information to the operation management server when receiving, from the operation management server, a request for the management information corresponding to one of the user groups in the virtual private network,
 wherein the operation management server includes a requesting unit designates the virtual private network for the one or more user groups and requests the first edge router to return the management information regarding the constituent elements of the network of each user group connected to the designated virtual private network, and
 wherein the operation management server constitutes a private network, which is independent of the virtual private network constituted for each of the user groups with respect to the first edge router, a request for the management information of the virtual private network is made to the corresponding virtual address by referring to a table of the operation management server which stores therein the virtual address that is the private address on the private network and the virtual private network by corresponding it to the private address, and
 in the case where the first router receives the request sent to the virtual address, an address of a second router belonging to the virtual private network, which is corresponded to the virtual address, is obtained from a table of the first router, a request for the management information is made to the address of the second router, and the management information, which has been returned from the second router in response to the request, is transmitted to the operation management server having the virtual address as the transmission source.

2. The network management system according to claim 1, wherein the first edge router further includes an information exchanging unit for exchanging the management information stored in the VPN for each of the user groups, with the first edge router.

3. The network management system according to claim 1, wherein the first edge router further includes a unit for setting a communication unit, when the management information is exchanged by the information exchanging unit for the VPN, for each of the user groups.

4. A network management method executed by a network management system comprising:
   a first edge router which connects at least one of networks of each of one or more user groups in a virtual private network;
   an operation management server which is connected to the first edge router and manages the virtual private network (VPN) and the networks of each of one or more user groups, and
   a second edge router which connects to the first edge router through the virtual private network, the second edge router being included in each of the networks of the one or more user groups,
   wherein the first edge router:
   collects management information regarding constituent elements of the network of the one or more user groups from the second edge router,
   stores the management information of the one or more user groups in the VPN, and
   returns the management information to the operation management sewer when receiving, from the operation management server, a request for the management information corresponding to one of the user groups in the virtual private network,
   wherein the operation management server designates the virtual private network for the one or more user groups and requests the first edge router to return the management information regarding the constituent elements of the network of each user group connected to the designated virtual private network, and
   wherein the operation management server constitutes a private network, which is independent of the virtual private network constituted for each of the user groups with respect to the first edge router, a request for the management information of the virtual private network is made to the corresponding virtual address by referring to a table of the operation management server which stores therein the virtual address that is the private address on the private network and the virtual private network by corresponding it to the private address, and
   in the case where the first router receives the request sent to the virtual address, an address of a second router belonging to the virtual private network, which is corresponded to the virtual address, is obtained from a table of the first router, a request for the management information is made to the address of the second router, and the management information, which has been returned from the second router in response to the request, is transmitted to the operation management server having the virtual address as the transmission source.

5. A first edge router which connects at least one of networks of each of one or more user group in a virtual private network, and which is connected to an operation management server, the operation management server manages the virtual private network (VPN) and the networks of each of one or more user groups, and a second edge router which connects to the first edge router through the virtual private network, the second edge router being included in each of the networks of the one or more user groups, wherein the first edge router comprises:
   a collecting unit collecting management information regarding constituent elements of the network of the one or more user groups from the second edge router;
   a unit storing the management information of the one or more user groups in the VPN; and
   a unit returning the management information to the operation management server when receiving, from the operation management server, a request for the management information corresponding to one of the user groups in the virtual private network,
   wherein the operation management server includes a requesting unit designates the virtual private network for the one or more user groups and requests the first edge router to return the management information regarding the constituent elements of the network of each user group connected to the designated virtual private network, and
   wherein the operation management server constitutes a private network, which is independent of the virtual private network constituted for each of the user groups with respect to the first edge router, a request for the management information of the virtual private network is made to the corresponding virtual address by referring to a table of the operation management server which stores therein the virtual address that is the private address on the private network and the virtual private network by corresponding it to the private address, and
   in the case where the first router receives the request sent to the virtual address, an address of a second router belonging to the virtual private network, which is corresponded to the virtual address, is obtained from a table of the first router, a request for the management information is made to the address of the second router, and the management information, which has been returned from the second router in response to the request, is transmitted to the operation management server having the virtual address as the transmission source.

6. The first edge router according to claim 5, further comprising an information exchanging unit exchanging the management information, stored in the VPN for each of the user groups, with the first edge router.

7. The first edge router according to claim 5, further comprising a unit for setting a communication unit, when the management information is exchanged by the information exchanging unit for the VPN, for each of the user groups.

* * * * *